(12) United States Patent
Sesti et al.

(10) Patent No.: US 11,199,758 B2
(45) Date of Patent: Dec. 14, 2021

(54) VEHICULAR CAMERA ASSEMBLY PROCESS WITH DUAL FOCUSING FEATURE

(71) Applicant: Magna Electronics Inc., Auburn Hills, MI (US)

(72) Inventors: Matthew C. Sesti, Williamston, MI (US); Robert A. Devota, Durand, MI (US); Donald W. Mersino, Montrose, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/947,484

(22) Filed: Aug. 4, 2020

(65) Prior Publication Data

US 2021/0041768 A1 Feb. 11, 2021

Related U.S. Application Data

(60) Provisional application No. 62/882,621, filed on Aug. 5, 2019.

(51) Int. Cl.

| | |
|---|---|
| *G03B 17/14* | (2021.01) |
| *G03B 13/32* | (2021.01) |
| *H04N 5/225* | (2006.01) |
| *B60R 11/04* | (2006.01) |
| *B60R 16/02* | (2006.01) |

(52) U.S. Cl.
CPC .............. *G03B 17/14* (2013.01); *G03B 13/32* (2013.01); *H04N 5/2253* (2013.01); *H04N 5/2254* (2013.01); *B60R 11/04* (2013.01); *B60R 16/0207* (2013.01)

(58) Field of Classification Search
None
See application file for complete search history.

(56) References Cited

U.S. PATENT DOCUMENTS

| | | | |
|---|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,690,268 B2 | 2/2004 | Schofield et al. |
| 6,824,281 B2 | 11/2004 | Schofield et al. |
| 7,038,577 B2 | 5/2006 | Pawlicki et al. |
| 7,480,149 B2 | 1/2009 | DeWard et al. |
| 7,720,580 B2 | 5/2010 | Higgins-Luthman |
| 7,855,755 B2 | 12/2010 | Weller et al. |
| 7,965,336 B2 | 6/2011 | Bingle et al. |

(Continued)

*Primary Examiner* — William B Perkey
(74) *Attorney, Agent, or Firm* — Honigman LLP

(57) ABSTRACT

A vehicular camera includes a lens barrel, a lens holder and an imager PCB. The lens barrel accommodates a lens and has a threaded inner end. The lens holder has a threaded passageway for threadedly receiving the threaded inner end of the lens barrel. The lens barrel is threadedly attached to the lens holder with a biasing element applying a biasing force at the lens barrel to urge the lens barrel in a direction outward away from the lens holder. The imager PCB is attached to the lens holder with an imager of the imager PCB facing the lens, and the imager PCB is adjusted relative to the lens holder and lens barrel construction to optically align the lens at the imager. After the imager PCB is secured relative to the lens holder, the lens barrel is rotated to adjust focus of the lens at the imager.

28 Claims, 6 Drawing Sheets

(56) References Cited

U.S. PATENT DOCUMENTS

| | | |
|---|---|---|
| 8,256,821 B2 | 9/2012 | Lawlor et al. |
| 8,542,451 B2 | 9/2013 | Lu et al. |
| 9,233,641 B2 | 1/2016 | Sesti et al. |
| 9,277,104 B2 | 3/2016 | Sesti et al. |
| 9,451,138 B2 | 9/2016 | Winden et al. |
| 9,487,159 B2 | 11/2016 | Achenbach |
| 9,596,387 B2 | 3/2017 | Achenbach et al. |
| 9,871,971 B2 | 1/2018 | Wang et al. |
| 9,896,039 B2 | 2/2018 | Achenbach et al. |
| 10,264,219 B2 | 4/2019 | Mleczko et al. |
| 10,272,857 B2 | 4/2019 | Conger et al. |
| 10,676,041 B2 | 6/2020 | Sesti et al. |
| 2013/0242099 A1 | 9/2013 | Sauer et al. |
| 2014/0373345 A1 | 12/2014 | Steigerwald |
| 2015/0222795 A1 | 8/2015 | Sauer et al. |
| 2015/0266430 A1 | 9/2015 | Mleczko et al. |
| 2015/0365569 A1 | 12/2015 | Mai et al. |
| 2016/0037028 A1 | 2/2016 | Biemer |
| 2016/0268716 A1 | 9/2016 | Conger et al. |
| 2017/0133811 A1 | 5/2017 | Conger et al. |
| 2017/0223243 A1* | 8/2017 | Nakamura ............. G02B 7/026 |
| 2017/0295306 A1 | 10/2017 | Mleczko |
| 2017/0302829 A1 | 10/2017 | Mleczko et al. |
| 2017/0307841 A1* | 10/2017 | Nakamura ............. G03B 17/55 |
| 2018/0027155 A1* | 1/2018 | Nakamura ............. G02B 7/003 |
| | | 348/374 |
| 2018/0072239 A1 | 3/2018 | Wienecke et al. |
| 2019/0098184 A1* | 3/2019 | An ........................ G03B 17/02 |
| 2020/0041874 A1* | 2/2020 | Nakamura ......... H04N 5/22521 |
| 2020/0225439 A1* | 7/2020 | Nakamura ............... G02B 7/04 |
| 2021/0041768 A1* | 2/2021 | Sesti ................... H04N 5/2253 |

* cited by examiner

US 11,199,758 B2

VEHICULAR CAMERA ASSEMBLY PROCESS WITH DUAL FOCUSING FEATURE

CROSS REFERENCE TO RELATED APPLICATION

The present application claims priority of U.S. provisional application Ser. No. 62/882,621, filed Aug. 5, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 7,965,336; 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle. The camera includes a lens holder and an imager printed circuit board, with the imager printed circuit board fixed to the lens holder, and with a lens barrel (accommodating a lens or lens assembly therein) attached at the lens holder. The camera also includes a rear housing that attaches at the lens holder after the lens and imager are optically aligned and focused. The lens barrel is threaded partially into the lens holder and the imager printed circuit board is adhesively bonded to the lens holder with the lens and imager optically aligned. After the imager printed circuit board is bonded and secured at the lens holder and after the rear housing is attached at the lens holder to encase the printed circuit board, the lens barrel may be rotated to adjust the focus of the lens and imager (such as in a fine adjustment manner to make very small adjustments after alignment of the lens and imager). The camera includes a biasing element that maintains an outward force on the lens barrel relative to the lens holder to compensate for any play or thread looseness between the threaded lens barrel and the threaded lens holder.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
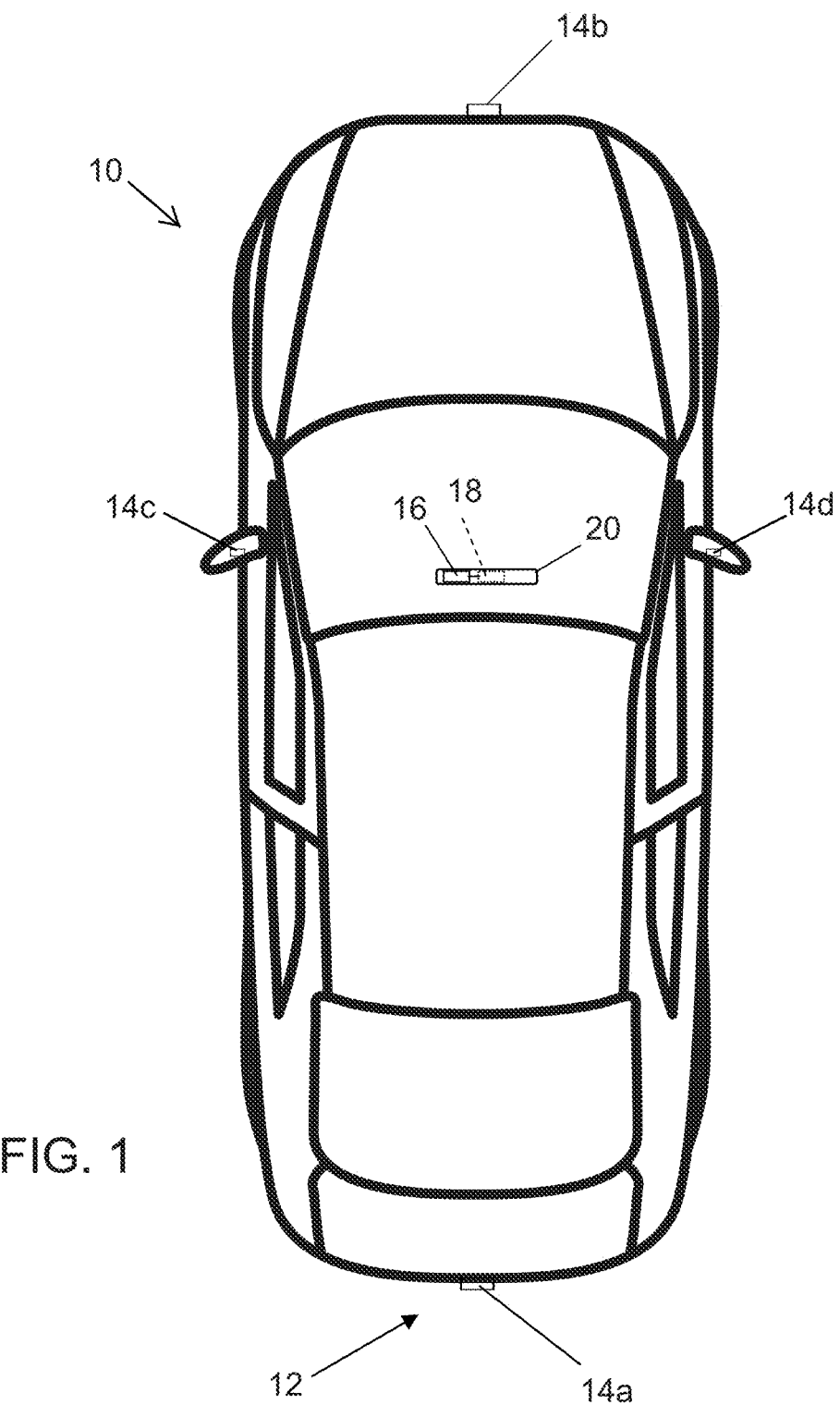
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens (such as a plurality of lens optics at a lens barrel that is accommodated at the lens holder) for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
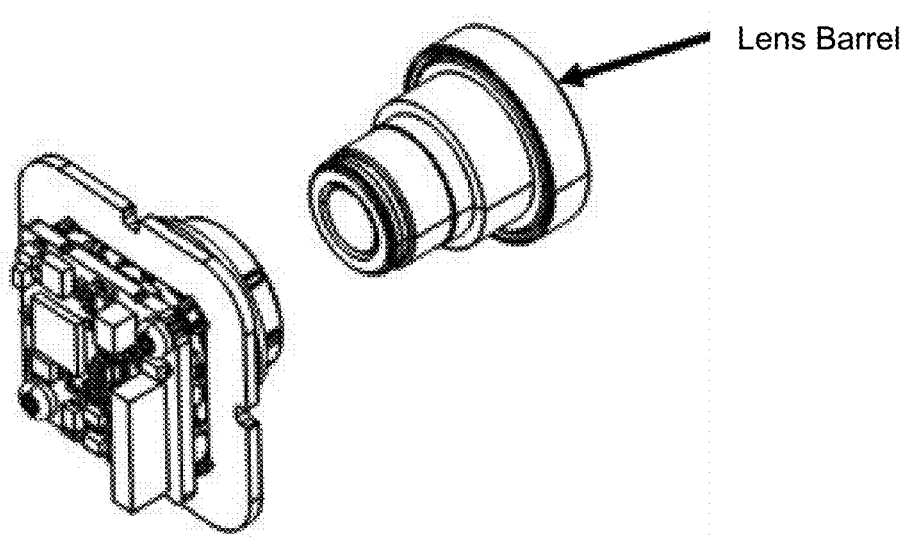
FIG. 2 is an exploded perspective view of part of a camera, showing threaded engagement of the lens barrel into the lens holder to threadedly attach the lens barrel at the lens holder, with the imager and printed circuit board attached at the lens holder.

Typically, active focus and alignment is used to set and secure a focal position of a lens to an imager component. However, this leads to expensive and complicated measures to manage the compliance tolerances created by camera components and manufacturing focus/alignment process. For example, and such as shown in FIG. 2, a camera may be assembled using an active PCB alignment, which may use screws to secure the PCB to the lens holder or front camera housing. After the PCB is secured to the lens holder, the lens barrel (such as a threaded lens barrel) is threaded into the lens holder and used to set the focus of the lens relative to the imager. After the lens and imager are optically aligned and focused (via threading the lens barrel into the lens holder), the lens barrel (and lens) is secured to the lens holder with adhesive on the lens threads. This method by itself compensates for three degrees of freedom (X, Y, Z).

Figure 3:
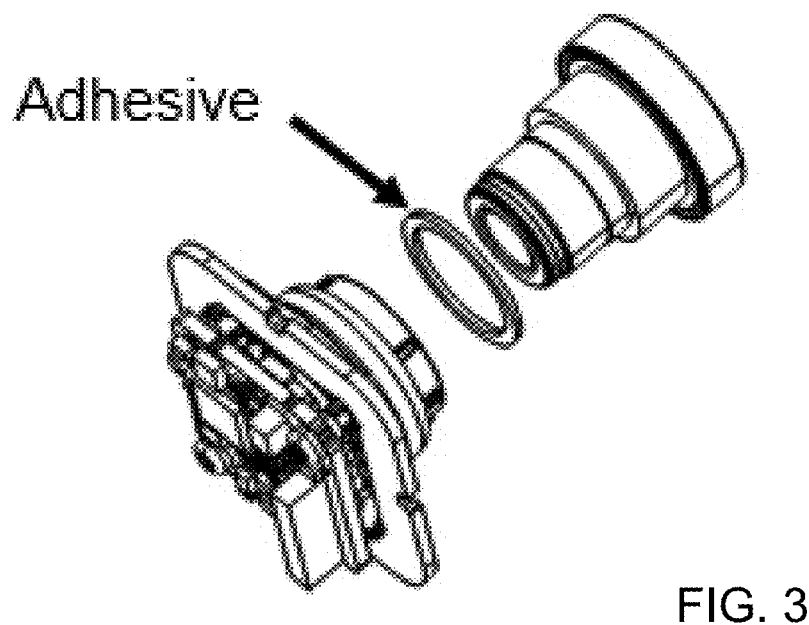
FIG. 3 is an exploded perspective view of part of another camera, showing engagement of the lens barrel into the lens holder to adhesively attach the lens barrel at the lens holder, with the imager and printed circuit board attached at the lens holder.

Optionally, and with reference to FIG. 3, active lens alignment may be provided where the imager PCB is secured to the housing using screws and the lens is actively moved to set focus and alignment, whereby a quick cure adhesive is used to set the focus and alignment of the lens relative to the imager. The adhesive acts as a compliant material (before it is cured) to allow for focus and alignment, which is achieved by moving the lens relative to the lens holder. The UV and additional curing increases the tolerance stack of the finished assembly. Quick cure adhesives require UV+additional curing. This curing increases the tolerance stack of the finished assembly. This method by itself compensates for five degrees of freedom (X, Y, Z, U, V) and does not allow for rotational correction.

Figure 4:
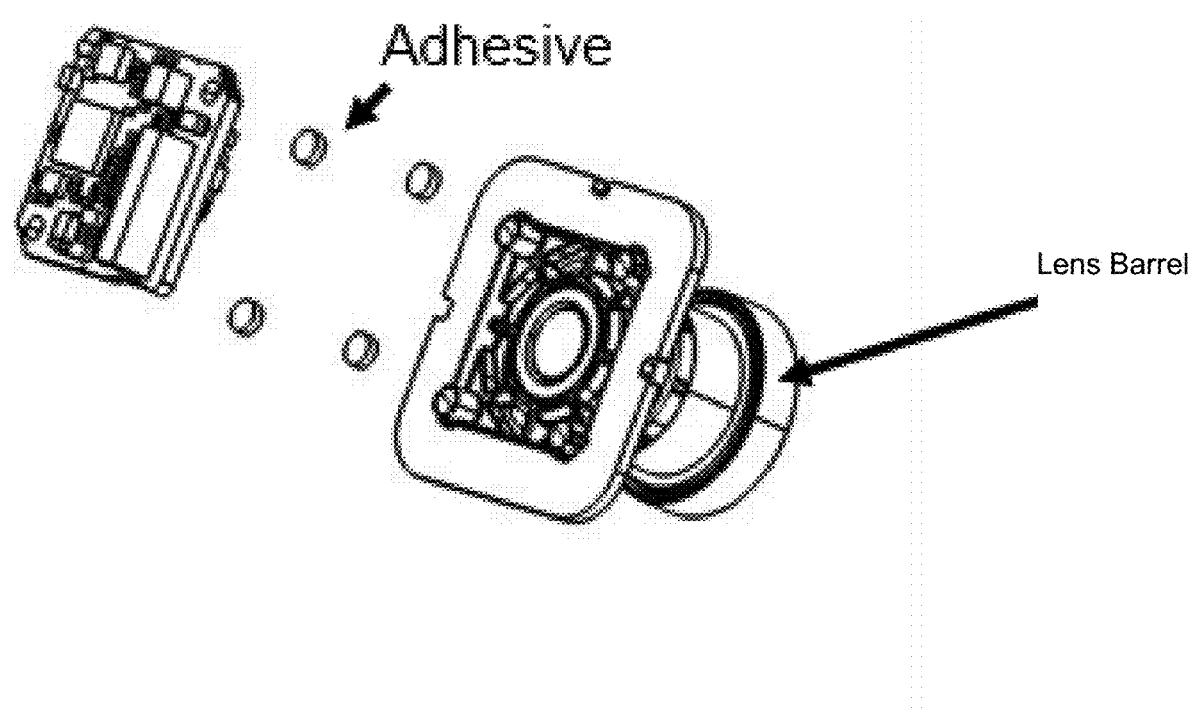
FIG. 4 is an exploded perspective view of part of another camera, showing attachment of the lens barrel at the lens holder, with the imager and printed circuit board attached at the lens holder after the lens barrel is attached thereat.

Optionally, and with reference to FIG. 4, active PCB focus and alignment is achieved via a one piece lens assembly that is secured to the housing or lens holder utilizing adhesive initially, and then the imager PCB is actively moved relative to the housing or lens holder to set focus, alignment, and rotation, where a quick cure adhesive is used to set the focus, alignment, and rotation. The adhesive (that bonds the circuit board to the lens holder) acts as a compliant material (before it is cured) to allow for focus and alignment, which is achieved by moving the PCB relative to the lens holder. The UV and additional curing increases the tolerance stack of the finished assembly, and quick cure adhesives require UV+additional curing. This curing increases the tolerance stack of the finished assembly. This method compensates for six degrees of freedom (X, Y, Z, U, V, W).

Referring now to FIGS. 5-11, an alternative build assembly process utilizes two focus and alignment methods, which allows for all degrees of freedom to be compensated for with adjusting the PCB for focus+alignment+rotation and with an additional fine tune or adjustment option (if needed if testing of the assembled camera indicates that the lens is not properly focused relative to the imager) to rotate a threaded lens to adjust the focus after all curing or additional processes are finished. The lens holder or threaded lens has a biasing element or spring load to compensate for thread looseness. The active PCB focus+alignment+rotation allows for a maximum of six degrees of freedom (X, Y, Z, U, V, W) of compensation. Final fine tuning of the threaded lens reduces the tolerance stack of the finished assembly by making a final focus adjustment after the curing or other processes.

Figure 5:
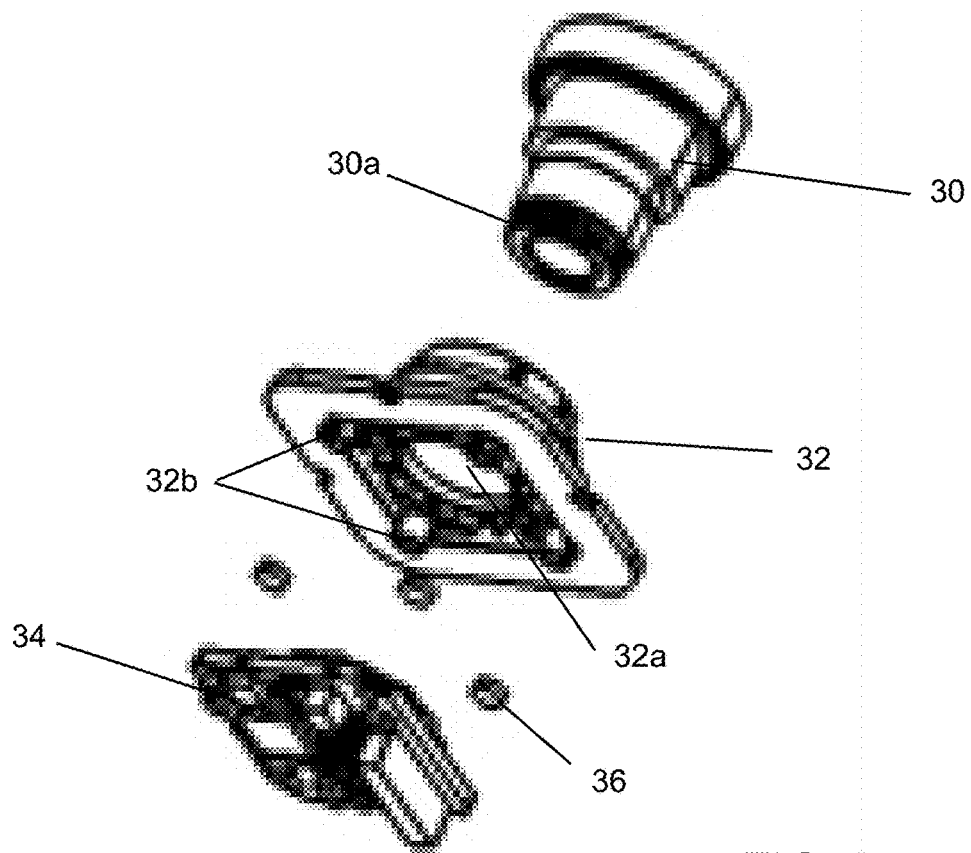
FIG. 5 is an exploded perspective view of a camera that is assembled in accordance with the present invention, showing the threaded lens barrel and the adhesive dots for attaching the circuit board at the lens holder.
Figure 6:
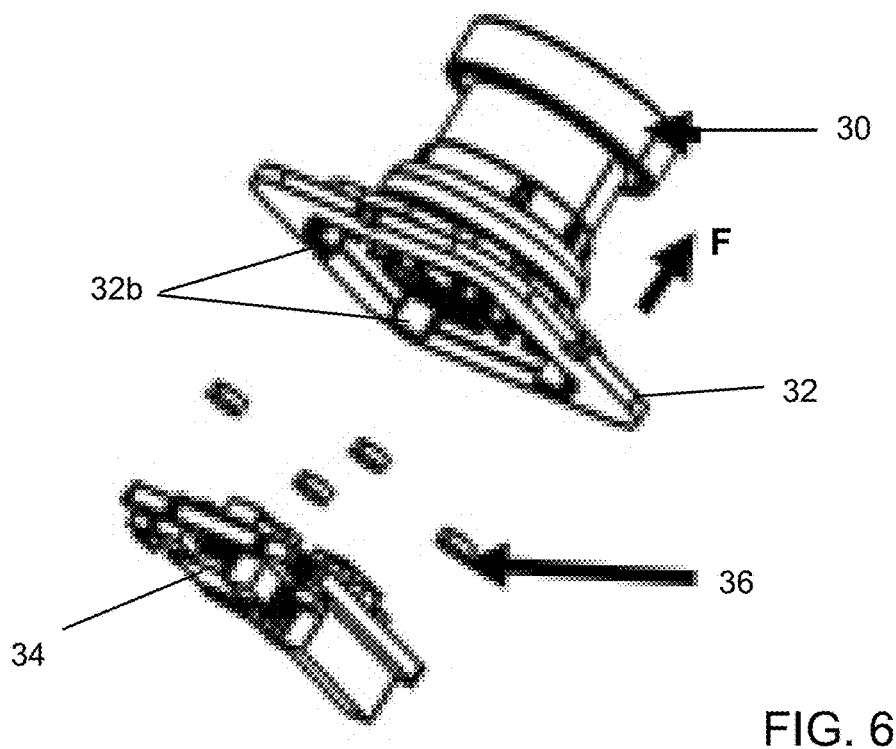
FIG. 6 is another exploded perspective view of the camera of FIG. 5, shown with the lens initially threaded into the lens holder, with a biasing force applied at the lens barrel to take up looseness in the threads.
Figure 7:
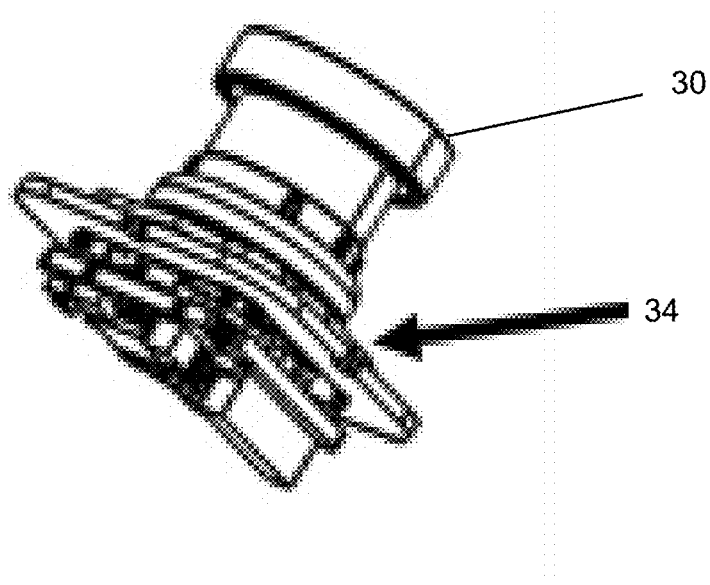
FIG. 7 is another exploded perspective view of the camera of FIG. 5, shown with the circuit board adhesively attached at the lens holder so that the imager and lens are optically aligned.

As shown in FIG. 5, the lens barrel 30 accommodates a lens or lens assembly (comprising a plurality of lens optics or elements) and has a threaded inner end 30a, which is threadedly received in a threaded passageway 32a of a lens holder or front camera housing 32. The imager is disposed at a front side of an imager printed circuit board 34, which is adhesively bonded at four posts 32b (such as via adhesive dots 36) that protrude from a rear side of the lens holder 32.

The assembly process starts by threading the lens barrel to a predetermined or selected distance into the lens holder (see FIGS. 5, 6 and 9), with a force "F" applied to the lens barrel in the direction away from the lens holder to reduce or limit or eliminate potential looseness between the lens holder and the lens barrel. The force may be applied via a biasing element at the lens holder or lens barrel (such as a compressible elastomeric element or spring element that is compressible and biased toward its uncompressed state). After the lens barrel is positioned at the lens holder (FIGS. 6, 10 and 11), the adhesive 36 is applied at either the posts 32b (and/or the posts may hold the adhesive therein or thereat) or at the front side of the imager PCB 34. With the PCB adhesively coupled to the lens holder via the adhesive (FIG. 7), the PCB is moved relative to the lens holder and lens to optically align and focus the lens and imager. The adhesive 36 acts as a compliant material to allow for six axis focus and alignment of the lens and imager. After the lens is optically aligned and focused at the imager, UV and additional curing means are applied to cure the adhesive and secure the PCB 34 at the lens holder 32.

Figure 8:
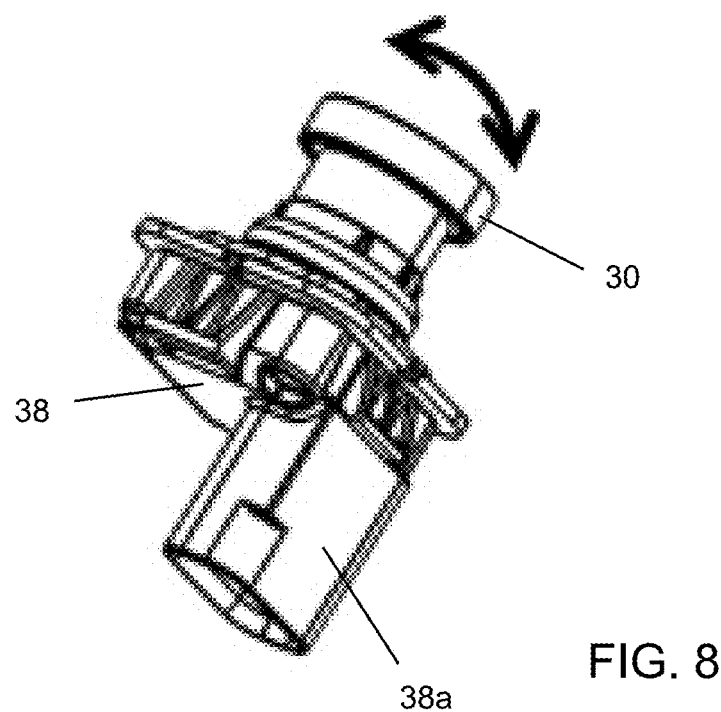
FIG. 8 is another exploded perspective view of the camera of FIG. 5, shown with the rear camera housing attached and showing fine adjustment of the lens barrel at the lens holder to adjust the focus of the lens with the imager.
Figure 9:
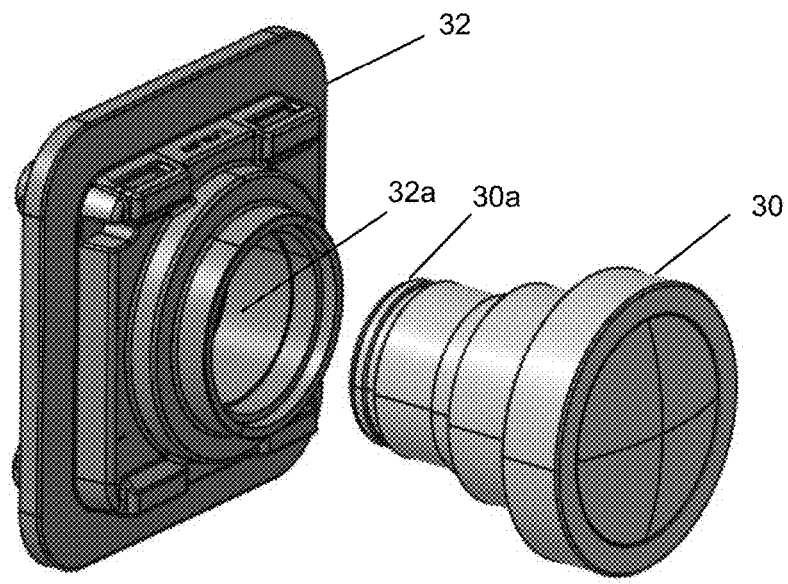
FIG. 9 is another exploded perspective view of the camera, showing the threaded end of the lens barrel.
Figure 10:
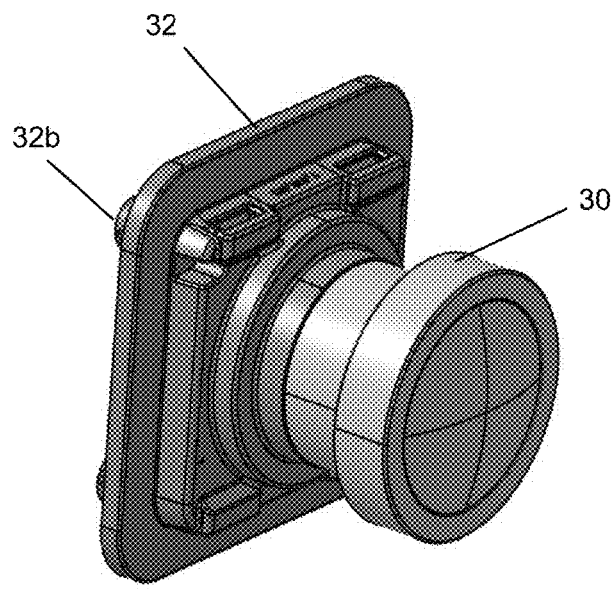
FIG. 10 is a perspective view of the lens barrel and lens holder construction.
Figure 11:
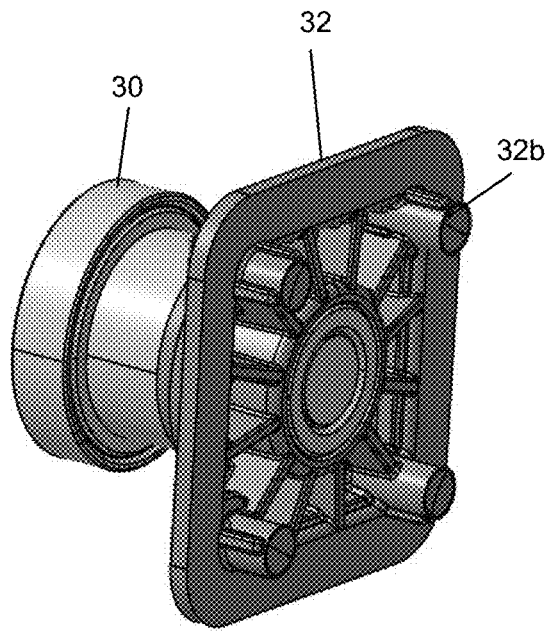
FIG. 11 is another perspective view of the lens barrel and lens holder construction, showing the inner end of the lens and the posts for adhesively bonding the imager circuit board at the lens holder.

The rear camera housing 38 (including an electrical connector portion 38a that is configured to electrically connect to a header connector at the PCB and to a vehicle wire harness) is attached (such as via fasteners or adhesive or welding) at the mating surface of the lens holder 32 to complete the assembly of the camera housing and to encase the PCB within the camera housing (FIG. 8). At this time, the PCB adhesive 36 is fully cured or at least substantially cured to its cured state, and any additional components (brackets, etc.) may be added to the camera assembly. The final fine tune focus adjustment of the lens relative to the imager is then achieved, if necessary, by rotating the lens relative to the lens barrel to more accurately fine tune the focus. For example, the camera may be tested to verify the proper focus of the lens at the imager and, if any correction or adjustment is needed, rotation of the lens may adjust or finely adjust the camera's focus as the final step of the camera assembly process.

The final adjustment of the lens barrel (and lens) is facilitated since the lens barrel is not adhesively secured in the lens holder. The spring loading of the lens barrel takes up or accommodates for any looseness in the threads of the lens barrel and lens holder, and helps to retain the lens barrel relative to the lens holder. Thus, the lens barrel and lens holder construction allows for post-assembly fine tuning and fine adjustment of the lens to accommodate for any movements that may have occurred between the PCB and the lens holder during the assembly and curing processes.

Optionally, an adhesive may be applied at the lens barrel and lens holder to further retain and secure the lens barrel at the lens holder after the fine tuning process is completed. Optionally, such as an adhesive may be applied before or during the lens barrel attachment to the lens holder, with the lens barrel adhesive being cured via a different means than the PCB adhesive, such that the lens barrel adhesive is not cured until after the camera is assembled and after the lens barrel is finely tuned to achieve optimal focus and alignment of the lens to the imager. The adhesive or epoxy may be applied to fill the threads between the lens barrel and the lens holder to seal the lens barrel at the lens holder.

The biasing force may be applied via any suitable means, such as via a pliable or compliant compound or element disposed in the threads or via a spring element or compressible or deformable element or pliable element or material (such as a deformable or compressible elastomeric material such as rubber) disposed at the lens holder and acting on the inner end of the lens barrel when the lens barrel is threaded into the lens holder. Optionally, the biasing force may be applied via a spring element or compressible or deformable element or pliable element or material (such as a deformable or compressible elastomeric material such as rubber) or the like disposed at the imager PCB and acting on the inner end of the lens barrel when the imager PCB is positioned at and adhesively bonded to the lens holder.

Although shown as having a single printed circuit board (having the imager at one side and circuitry and connecting elements (such as a header connector) at the other side), the camera assembly may include an imager printed circuit board and a separate connector printed circuit board, with the circuitry of the two printed circuit boards electrically connected. The printed circuit boards may be attached at the lens holder or to the rear camera housing, and/or may be attached to one another, such as by utilizing aspects of the cameras and processes described in U.S. Pat. No. 10,676,041, which is hereby incorporated herein by reference in its entirety. The imager is aligned with the lens at the lens holder and the lens is optically aligned and focused with the imager and the housing portions are joined or bonded, such as by utilizing aspects of the cameras and processes described in U.S. Pat. Nos. 10,272,857; 10,264,219; 9,451,138; 9,277,104 and/or 8,542,451, which are hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the camera may comprise a forward viewing camera, such as disposed at a windshield electronics module (WEM) or the like. The imager PCB and lens holder and lens construction may be disposed at and electrically connected to a processor PCB of the camera module, such as via a flexible electrical connector, with the lens barrel disposed at or protruding through an aperture at an upper housing portion. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera configured to be disposed at a vehicle so as to have a field of view exterior of the vehicle, the vehicular camera comprising:
   a lens barrel accommodating a lens, the lens barrel having a threaded inner end;
   a lens holder comprising a threaded passageway for threadedly receiving the threaded inner end of the lens barrel;
   an imager printed circuit board, wherein the imager printed circuit board comprises a first side and a second side opposite the first side and separated from the first side by a thickness of the imager printed circuit board, and wherein an imager is disposed at the first side of the imager printed circuit board;
   wherein the lens barrel is threadedly attached to the lens holder, and wherein a biasing element applies a biasing force at the lens barrel to urge the lens barrel in a direction outward away from the lens holder;
   wherein the imager printed circuit board is attached to the lens holder with the first side of the imager printed circuit board and the imager facing the lens, and wherein the imager printed circuit board is adjusted relative to the lens holder and lens barrel construction to optically align the lens at the imager;
   wherein, after the imager printed circuit board is secured relative to the lens holder, the lens barrel is rotated to adjust focus of the lens at the imager; and
   a rear housing that is mated with the lens holder to encase the imager printed circuit board.

2. The vehicular camera of claim 1, wherein the lens barrel is rotated to adjust focus of the lens at the imager after the rear housing is mated with the lens holder.

3. The vehicular camera of claim 1, wherein the rear housing is mated with the lens holder after the imager printed circuit board is attached to the lens holder.

4. The vehicular camera of claim 1, wherein an electrical connector portion of the rear housing is configured to electrically connect to a wire harness of a vehicle equipped with the vehicular camera.

5. The vehicular camera of claim 1, wherein the biasing element comprises a compressible elastomeric material.

6. The vehicular camera of claim 5, wherein the compressible elastomeric material comprises a rubber material.

7. A vehicular camera configured to be disposed at a vehicle so as to have a field of view exterior of the vehicle, the vehicular camera comprising:
 a lens barrel accommodating a lens, the lens barrel having a threaded inner end;
 a lens holder comprising a threaded passageway for threadedly receiving the threaded inner end of the lens barrel;
 an imager printed circuit board, wherein the imager printed circuit board comprises a first side and a second side opposite the first side and separated from the first side by a thickness of the imager printed circuit board, and wherein an imager is disposed at the first side of the imager printed circuit board;
 wherein the lens barrel is threadedly attached to the lens holder, and wherein a biasing element applies a biasing force at the lens barrel to urge the lens barrel in a direction outward away from the lens holder;
 wherein the imager printed circuit board is attached to the lens holder with the first side of the imager printed circuit board and the imager facing the lens, and wherein the imager printed circuit board is adjusted relative to the lens holder and lens barrel construction to optically align the lens at the imager;
 wherein, after the imager printed circuit board is secured relative to the lens holder, the lens barrel is rotated to adjust focus of the lens at the imager;
 wherein the biasing element comprises a compressible elastomeric material; and
 wherein the biasing element is disposed at least partially between threads of the threaded inner end of the lens barrel and threads of the threaded passageway of the lens holder.

8. The vehicular camera of claim 5, wherein the biasing element is disposed at the lens holder and acts on the threaded inner end of the lens barrel when the threaded inner end of the lens barrel is threaded into the threaded passageway of the lens holder.

9. A vehicular camera configured to be disposed at a vehicle so as to have a field of view exterior of the vehicle, the vehicular camera comprising:
 a lens barrel accommodating a lens, the lens barrel having a threaded inner end;
 a lens holder comprising a threaded passageway for threadedly receiving the threaded inner end of the lens barrel;
 an imager printed circuit board, wherein the imager printed circuit board comprises a first side and a second side opposite the first side and separated from the first side by a thickness of the imager printed circuit board, and wherein an imager is disposed at the first side of the imager printed circuit board;
 wherein the lens barrel is threadedly attached to the lens holder, and wherein a biasing element applies a biasing force at the lens barrel to urge the lens barrel in a direction outward away from the lens holder;
 wherein the imager printed circuit board is attached to the lens holder with the first side of the imager printed circuit board and the imager facing the lens, and wherein the imager printed circuit board is adjusted relative to the lens holder and lens barrel construction to optically align the lens at the imager;
 wherein, after the imager printed circuit board is secured relative to the lens holder, the lens barrel is rotated to adjust focus of the lens at the imager;
 wherein the biasing element comprises a compressible elastomeric material; and
 wherein the biasing element is disposed at the imager printed circuit board and acts on the threaded inner end of the lens barrel when the imager printed circuit board is attached to the lens holder.

10. A vehicular camera configured to be disposed at a vehicle so as to have a field of view exterior of the vehicle, the vehicular camera comprising:
 a lens barrel accommodating a lens, the lens barrel having a threaded inner end;
 a lens holder comprising a threaded passageway for threadedly receiving the threaded inner end of the lens barrel;
 an imager printed circuit board, wherein the imager printed circuit board comprises a first side and a second side opposite the first side and separated from the first side by a thickness of the imager printed circuit board, and wherein an imager is disposed at the first side of the imager printed circuit board;
 wherein the lens barrel is threadedly attached to the lens holder, and wherein a biasing element applies a biasing force at the lens barrel to urge the lens barrel in a direction outward away from the lens holder;
 wherein the imager printed circuit board is attached to the lens holder with the first side of the imager printed circuit board and the imager facing the lens, and wherein the imager printed circuit board is adjusted relative to the lens holder and lens barrel construction to optically align the lens at the imager;
 wherein, after the imager printed circuit board is secured relative to the lens holder, the lens barrel is rotated to adjust focus of the lens at the imager; and
 wherein the biasing element comprises a spring element disposed at the imager printed circuit board so as to act on the threaded inner end of the lens barrel when the imager printed circuit board is attached to the lens holder.

11. A method for assembling a vehicular camera, the method comprising:
 providing a lens barrel accommodating a lens and having a threaded inner end;
 providing a lens holder comprising a threaded passageway;
 providing an imager printed circuit board, wherein the imager printed circuit board comprises a first side and a second side opposite the first side and separated from the first side by a thickness of the imager printed circuit board, and wherein an imager is disposed at the first side of the imager printed circuit board;
 threadedly inserting the threaded inner end of the lens barrel into the threaded passageway of the lens holder;
 applying a biasing force at the lens barrel to urge the lens barrel in a direction away from the lens holder;
 after the lens barrel is threadedly inserted into the lens holder, positioning the imager printed circuit board at the lens holder and optically aligning the lens at the imager via movement of the imager printed circuit board relative to the lens holder;
 attaching the imager printed circuit board to the lens holder with the first side of the imager printed circuit board and the imager facing the lens and with the lens optically aligned with and focused at the imager;

after the imager printed circuit board is attached to the lens holder, rotating the lens barrel to adjust focus of the lens relative to the imager; and providing a rear housing and attaching the rear housing to the lens holder to encase the image printed circuit board within the vehicular camera.

12. The method of claim 11, wherein the step of rotating the lens barrel to adjust focus of the lens relative to the imager is performed after the rear housing is attached to the lens holder.

13. A method for assembling a vehicular camera, the method comprising:

providing a lens barrel accommodating a lens and having a threaded inner end;

providing a lens holder comprising a threaded passageway;

providing an imager printed circuit board, wherein the imager printed circuit board comprises a first side and a second side opposite the first side and separated from the first side by a thickness of the imager printed circuit board, and wherein an imager is disposed at the first side of the imager printed circuit board;

threadedly inserting the threaded inner end of the lens barrel into the threaded passageway of the lens holder;

applying a biasing force at the lens barrel to urge the lens barrel in a direction away from the lens holder;

after the lens barrel is threadedly inserted into the lens holder, positioning the imager printed circuit board at the lens holder and optically aligning the lens at the imager via movement of the imager printed circuit board relative to the lens holder;

attaching the imager printed circuit board to the lens holder with the first side of the imager printed circuit board and the imager facing the lens and with the lens optically aligned with and focused at the imager;

wherein attaching the imager printed circuit board to the lens holder comprises adhesively attaching the imager printed circuit board to the lens holder with an adhesive and curing the adhesive to fix the imager printed circuit board at the lens holder; and after the imager printed circuit board is attached to the lens holder, rotating the lens barrel to adjust focus of the lens relative to the imager.

14. The method of claim 13, wherein the step of rotating the lens barrel to adjust focus of the lens relative to the imager is performed after the adhesive is cured.

15. The method of claim 13, wherein the adhesive, in its uncured state, allows for movement between the imager printed circuit board and the lens holder in all directions during assembly of the vehicular camera.

16. A method for assembling a vehicular camera, the method comprising:

providing a lens barrel accommodating a lens and having a threaded inner end;

providing a lens holder comprising a threaded passageway;

providing an imager printed circuit board, wherein the imager printed circuit board comprises a first side and a second side opposite the first side and separated from the first side by a thickness of the imager printed circuit board, and wherein an imager is disposed at the first side of the imager printed circuit board;

threadedly inserting the threaded inner end of the lens barrel into the threaded passageway of the lens holder;

applying a biasing force at the lens barrel to urge the lens barrel in a direction away from the lens holder;

wherein applying the biasing force comprises disposing a biasing element at least partially between threads of the threaded inner end of the lens barrel and threads of the threaded passageway of the lens holder;

after the lens barrel is threadedly inserted into the lens holder, positioning the imager printed circuit board at the lens holder and optically aligning the lens at the imager via movement of the imager printed circuit board relative to the lens holder;

attaching the imager printed circuit board to the lens holder with the first side of the imager printed circuit board and the imager facing the lens and with the lens optically aligned with and focused at the imager; and after the imager printed circuit board is attached to the lens holder, rotating the lens barrel to adjust focus of the lens relative to the imager.

17. The method of claim 16, wherein the biasing element comprises a pliable material.

18. The method of claim 17, wherein the pliable material comprises a compressible elastomeric material.

19. The method of claim 11, wherein applying the biasing force comprises disposing a biasing element at the lens holder to act on the threaded inner end of the lens barrel when the threaded inner end of the lens barrel is threaded into the threaded passageway of the lens holder.

20. A method for assembling a vehicular camera, the method comprising:

providing a lens barrel accommodating a lens and having a threaded inner end;

providing a lens holder comprising a threaded passageway;

providing an imager printed circuit board, wherein the imager printed circuit board comprises a first side and a second side opposite the first side and separated from the first side by a thickness of the imager printed circuit board, and wherein an imager is disposed at the first side of the imager printed circuit board;

threadedly inserting the threaded inner end of the lens barrel into the threaded passageway of the lens holder;

applying a biasing force at the lens barrel to urge the lens barrel in a direction away from the lens holder;

after the lens barrel is threadedly inserted into the lens holder, positioning the imager printed circuit board at the lens holder and optically aligning the lens at the imager via movement of the imager printed circuit board relative to the lens holder;

attaching the imager printed circuit board to the lens holder with the first side of the imager printed circuit board and the imager facing the lens and with the lens optically aligned with and focused at the imager;

wherein applying the biasing force comprises disposing a biasing element the imager printed circuit board to act on the threaded inner end of the lens barrel when the imager printed circuit board is attached to the lens holder; and after the imager printed circuit board is attached to the lens holder, rotating the lens barrel to adjust focus of the lens relative to the imager.

21. A method for assembling a vehicular camera, the method comprising:

providing a lens barrel accommodating a lens and having a threaded inner end;

providing a lens holder comprising a threaded passageway;

providing an imager printed circuit board, wherein the imager printed circuit board comprises a first side and a second side opposite the first side and separated from the first side by a thickness of the imager printed circuit board, and wherein an imager is disposed at the first side of the imager printed circuit board;

threadedly inserting the threaded inner end of the lens barrel into the threaded passageway of the lens holder;

applying a biasing force at the lens barrel to urge the lens barrel in a direction away from the lens holder;

after the lens barrel is threadedly inserted into the lens holder, positioning the imager printed circuit board at the lens holder and optically aligning the lens at the imager via movement of the imager printed circuit board relative to the lens holder;

attaching the imager printed circuit board to the lens holder with the first side of the imager printed circuit board and the imager facing the lens and with the lens optically aligned with and focused at the imager;

wherein applying the biasing force comprises disposing a spring element at the imager printed circuit board to act on the threaded inner end of the lens barrel when the imager printed circuit board is attached to the lens holder; and after the imager printed circuit board is attached to the lens holder, rotating the lens barrel to adjust focus of the lens relative to the imager.

22. A vehicular camera configured to be disposed at a vehicle so as to have a field of view exterior of the vehicle, the vehicular camera comprising:

a lens barrel accommodating a lens, the lens barrel having a threaded inner end;

a lens holder comprising a threaded passageway for threadedly receiving the threaded inner end of the lens barrel;

an imager printed circuit board, wherein the imager printed circuit board comprises a first side and a second side opposite the first side and separated from the first side by a thickness of the imager printed circuit board, and wherein an imager is disposed at the first side of the imager printed circuit board;

wherein the lens barrel is threadedly attached to the lens holder, and wherein a biasing element applies a biasing force at the lens barrel to urge the lens barrel in a direction outward away from the lens holder;

wherein the imager printed circuit board is attached to the lens holder with the first side of the imager printed circuit board and the imager facing the lens, and wherein the imager printed circuit board is adjusted relative to the lens holder and lens barrel construction to optically align the lens at the imager;

a rear housing that is mated with the lens holder, with the imager printed circuit board attached to the lens holder, to encase the imager printed circuit board;

wherein, after the imager printed circuit board is secured relative to the lens holder and after the rear housing is mated with the lens holder, the lens barrel is rotated to adjust focus of the lens at the imager; and wherein an electrical connector portion of the rear housing is configured to electrically connect to a wire harness of a vehicle equipped with the vehicular camera.

23. The vehicular camera of claim 22, wherein the biasing element comprises a compressible elastomeric material.

24. The vehicular camera of claim 23, wherein the compressible elastomeric material comprises a rubber material.

25. The vehicular camera of claim 23, wherein the biasing element is disposed at least partially between threads of the threaded inner end of the lens barrel and threads of the threaded passageway of the lens holder.

26. The vehicular camera of claim 23, wherein the biasing element is disposed at the lens holder and acts on the threaded inner end of the lens barrel when the threaded inner end of the lens barrel is threaded into the threaded passageway of the lens holder.

27. The vehicular camera of claim 23, wherein the biasing element is disposed at the imager printed circuit board and acts on the threaded inner end of the lens barrel when the imager printed circuit board is attached to the lens holder.

28. The vehicular camera of claim 22, wherein the biasing element comprises a spring element disposed at the imager printed circuit board so as to act on the threaded inner end of the lens barrel when the imager printed circuit board is attached to the lens holder.

* * * * *